Jan. 28, 1930.　　　W. C. MORAN　　　1,745,182
RECOIL APPARATUS FOR TESTING MACHINES AND THE LIKE
Filed June 20, 1928　　　2 Sheets-Sheet 1

INVENTOR.
WILLIAM C. MORAN,
BY
ATTORNEYS

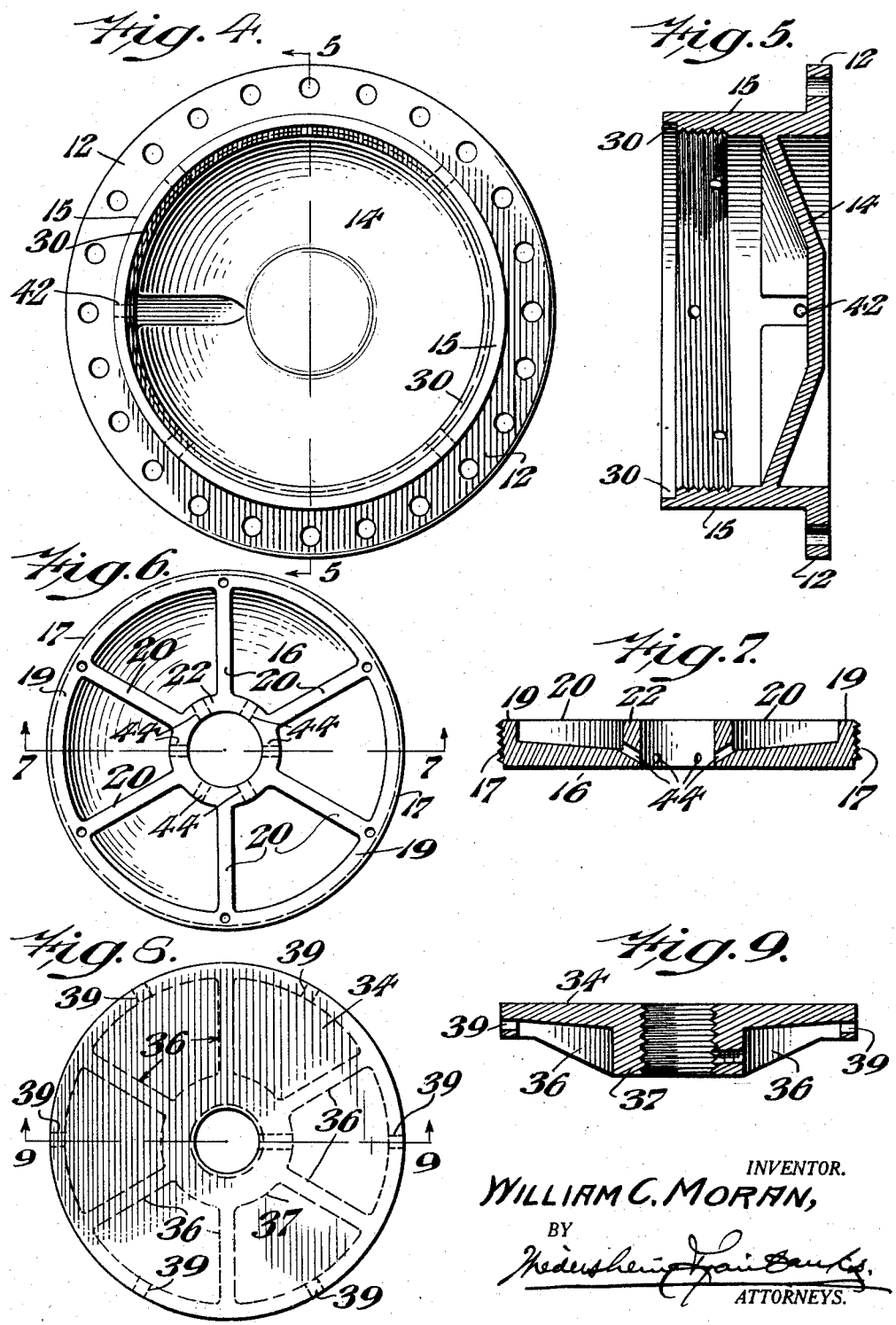

Patented Jan. 28, 1930

1,745,182

UNITED STATES PATENT OFFICE

WILLIAM C. MORAN, OF LAUREL SPRINGS, NEW JERSEY, ASSIGNOR TO RIEHLE BROS. TESTING MACHINE CO., OF PHILADELPHIA, PENNSYLVANIA, A CORPORATION OF PENNSYLVANIA

RECOIL APPARATUS FOR TESTING MACHINES AND THE LIKE

Application filed June 20, 1928. Serial No. 286,995.

In testing machines used to test the tensile, compressive or transverse strength of various materials, the materials being tested are subjected to excessive loads so that sudden breakage usually occurs. The relief of the stress in the machine supporting the specimen causes a tendency to recoil or rebound with a force and violence proportional to the amount of pressure exerted which in some instances runs into millions of pounds of force.

To cushion this recoil or rebound and to absorb the shock incidental thereto, various expedients have been employed, such as the use of wooden, fiber, or other resilient cushioning blocks as well as the use of springs and the like, all of which however, in practice, did not give entire satisfaction.

My present invention relates to a new and useful absorbing apparatus particularly adapted for use on testing machines and the like of the character referred to, whereby the shock incident to the recoil or rebound of a testing machine, due to the sudden release or cessation of excessive pressure is effectively cushioned and absorbed thus preventing or reducing to a minimum, all accidental injury and wear and tear.

It is the object of my invention to provide a shock absorbing apparatus for testing machines which will effectively absorb and cushion shocks of great magnitude incident to the rebound or recoil of a testing machine which take place when the specimen subjected to excessive force suddenly fractures, thus releasing an excessive amount of confined force and energy.

It is a further object of my invention to provide a shock absorbing apparatus which is applicable to all manner of testing and other machinery, where violent recoil or rebound takes place, since my novel invention as will hereinafter be apparent is not confined by size or shape to any particular type of machine.

It is still a further object of my invention to provide a shock absorbing apparatus which is durable and in which depreciation, deterioration, and breakage, and the necessary consequent replacement and repair heretofore incident to conventional shock absorbing blocks, springs and similar expedients are reduced to a minimum.

To the above ends my invention consists in providing the table or specimen support of a testing machine with a recoil stud supporting at its lower end a lower recoil platen coacting with an upper recoil platen, both platens positioned within an oil retainer within which is a cushioning fluid which is compressed between the said upper and lower recoil platens by the upward movement of the table and the lower recoil platen, which takes place when the pressure is relieved due to the breaking or snapping of the specimen being tested, thus absorbing and cushioning the shock otherwise incident to the unchecked recoil or rebound of the table or specimen support and its adjuncts.

My invention further consists of various other novel features of construction and advantage hereinafter described and claimed.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figures 4, 6 and 8 represent in plan view, certain details of the construction of oil retainer, upper recoil platen and lower recoil platen shown in the bottom portion of Figure 2.

Figure 1:
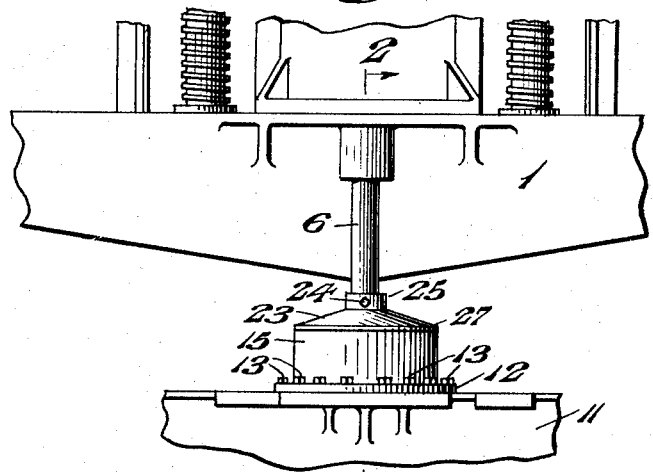
Figure 1, represents a fragmentary view in elevation, of the lower portion of a testing machine equipped with a recoil or shock absorbing apparatus, embodying my invention.
Figure 3:
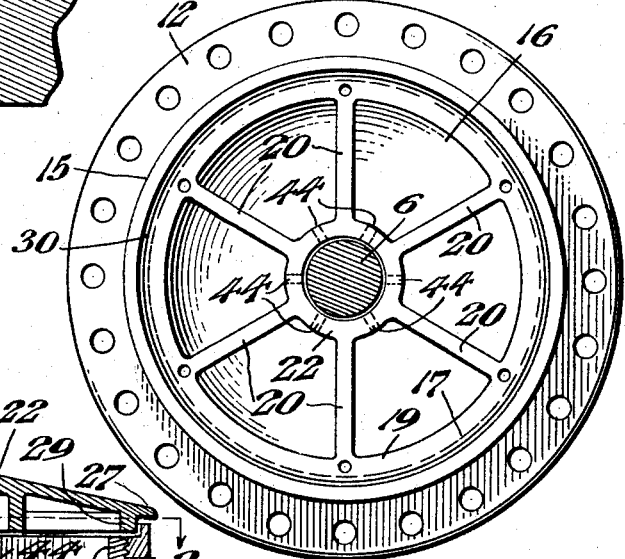
Figure 3, represents a transverse section on line 3—3 of Figure 2.

Figures 5, 7 and 9 represent sectional views on lines 5—5, 7—7 and 9—9 of Figures 4, 6 and 8 respectively.

Referring to the drawings in which like reference characters indicate like parts, 1 designates a specimen support, commonly known as the table of a testing machine, and on which the pressure to which a specimen is subjected is exerted in a downward direction, whence said pressure is transmitted through a series of lever mechanisms to the weighing beam, (not shown). To the lower side of the table or specimen support 1 is secured a plurality of recoil studs 6, (only one being shown in the accompanying drawings,) the upper ends of which are threaded as at 8 and provided with the recess 9 for receiving a retaining screw or key not shown, to prevent the rotation of said stem with respect to said table when the latter is subjected to stress and strain. 11 designates a base plate or support for the table 1, commonly known as a cover plate since it covers or encloses the gearing which rotates the pulling screws.

To the plate 11 is secured the cup shaped oil retainer 12 by means of the bolts 13, said oil retainer being preferably cylindrical and comprising the bottom wall 14, and the annular vertical wall 15 in the upper portion 17 of which is threaded the upper recoil platen 16 which is locked against rotation or displacement by the set screw or key, or the like, 19. The upper recoil platen 16 is provided with the reinforcing radial ribs or webs 20, and the central hub 22 through which freely passes the lower end of the recoil stud 6, as will be understood from Figure 2, said hub being provided with the ports 44. The oil splash cover or cover plate 23 is secured fast to the recoil stud 6 by means of the screw 24 common to the hub 25 and said recoil stud so that the latter and said cover move as a unit. The cover 23 is provided with the peripheral, annular extension 27, which overhangs or overlaps the upper edge of the annular wall 15 of the oil retainer 12 and said cover also has the annular pendant flange 29, which seats in the female counterbore 30 in the upper edge of the annular wall 15 of the oil retainer 12 but is in no place in contact with any part of said oil retainer. To the lower end of the recoil stud 6 is threaded the lower recoil platen 34 which is locked against rotation by the set screw 35 common to the hub 37 and said stud, said lower recoil platen being thus fast on the lower end of said stud and moving as a unit therewith below the fixed platen 16 within the oil retainer 12.

It will be apparent from the foregoing that the movable elements 1, 6, 23 and 37 move as a unit with respect to the stationary elements comprising the oil retainer 12 and the fixed upper recoil platen 16, and that the lower portion of said oil retainer serves as a reservoir for the oil.

The operation is as follows:—

When a specimen is being tested, the pressure to which it is subjected is exerted downwardly upon the table or specimen support 1 from which the force is transmitted to the weighing beam to be measured. When the table is thus pressed downwardly, the lower recoil platen 34 fast on the lower end of the recoil stud 6 is moved downwardly a corresponding distance from the upper recoil platen 16. The oil retainer being filled to capacity with the proper grade of oil or other cushioning fluid, the movement of the lower platen 34 downwardly displaces some of this oil which now flows through the ports 39 provided in the outer pendant wall of the lower platen 34, and the space 40 provided between said platen and the annular wall 15 of the oil retainer 12 to fill the space 41 between the upper surface of the movable platen 34 and the underside of the stationary platen 16. When the pressure on the table 1 is suddenly relieved due to the breaking of the specimen being tested, the table 1, recoil stud 6 and movable platen 34 tend to recoil or rebound violently in an upward direction. As the lower movable platen 34 moves upwardly, it compresses the film of oil formed therebetween and the stationary platen 16 and forces said oil upwardly through the ports 44 near the base of the hub 22. The compression and gradual egress of the oil obviously retards and cushions the movement of the lower platen 34 and the table 1, by which it is rigidly carried. The oil splash cover 23 prevents the splashing of the oil forcibly expelled through the ports 44, so that when everything is at rest, the oil flows back through said ports 44 and 39 into the oil retainer 12 to be used over again. The oil splash cover 23 is secured fast on the recoil stud 6 to prevent the egress of oil at any point, while the peripheral extension 27 and the pendant flange 29 serve effectively to seal the peripheral exits without any contact or engagement of the periphery of the cover 23 with the upper periphery of the annular wall 15 of the cup shaped member 12, as will be understood from Figure 2. The oil retainer 12 is provided with the drain opening 42 (see Fig. 5) which is normally closed, but which may be opened to drain the oil from the oil retainer if desired.

While the extent of the vertical displacement of the lower platen 34 due to the pressure on the table 1 is relatively small, the pressure is relatively great, often running into millions of pounds, so that the recoil or rebound of the table and its adjuncts when this tremendous pressure is suddenly relieved by the breaking of the specimen being tested is extremely violent and requires highly efficient cushioning or shock absorbing devices, to avoid serious damage and injury. By experiment, I have found that a fluid as the proper grade of oil possessing the requisite degree of viscosity, and suitably confined, affords the most desirable and efficient cushioning means. A fluid of the proper viscosity suitably confined in the oil retainer and between the platens of my novel construction, so that its compression and expulsion are regulated and under control, will not only effectively retard the movement of said plunger, but will also eliminate entirely all shock otherwise incident to a violent, unchecked recoil.

While I have illustrated only one shock absorbing apparatus embodying my invention, it is to be understood that a plurality of such apparatus may be employed, depending upon the size and form of the specimen support or table 1, and the amount of pressure to which such table is to be subjected.

Figure 2:
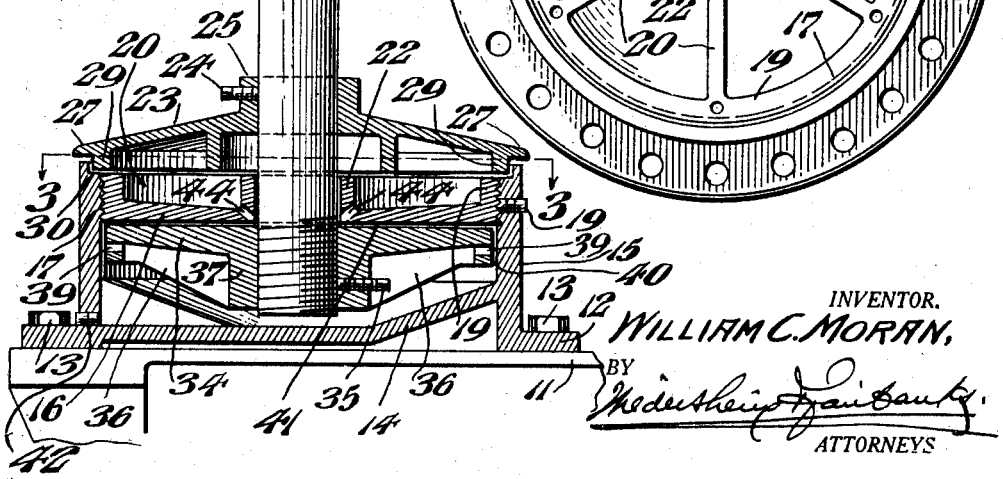
Figure 2, represents on an enlarged scale, a sectional view on line 2—2 of Figure 1, certain parts being shown in elevation.

It will be apparent from the foregoing that my novel recoil apparatus has a relatively slight movement and that the movable recoil platen rigidly carried by the free end of the recoil stud has a relatively large area and that the stationary recoil platen also has a relatively large area juxtaposed to the movable platen so that the film of shock absorbing fluid of suitable viscosity intermediate the juxtaposed surfaces of the movable and stationary platens will effectively absorb all shocks, the flange or male counterbore 29 normally being out of contact with any part of the oil retainer, as will be understood from Figure 2.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. Recoil apparatus comprising a recoil stud adapted for connection with the device subject to a recoil of relatively great force and having a relatively slight movement, a movable recoil platen having a relatively large area rigidly carried by the free end of said recoil stud and transversely thereof, a stationary recoil platen extending parallel to and substantially coextensive with said movable recoil platen and spaced a relatively slight distance therefrom, and a film of shock absorbing fluid of suitable viscosity intermediate of said movable and stationary recoil platens.

2. Recoil apparatus comprising a recoil stud adapted for connection with the device subject to a recoil of relatively great force and having a relatively slight movement, a movable recoil platen having a relatively large area rigidly carried by the free end of said recoil stud and transversely thereof, a stationary recoil platen extending parallel to and substantially coextensive with said movable recoil platen and spaced a relatively slight distance therefrom, and a film of shock absorbing fluid of suitable viscosity intermediate of said movable and stationary recoil platens, said recoil stud passing freely through said stationary platen, and said movable platen being positioned below the latter.

3. Recoil apparatus comprising a recoil stud adapted for connection with the device subject to a recoil of relatively great force and having a relatively slight movement, a movable recoil platen having a relatively large area rigidly carried by the free end of said recoil stud and transversely thereof, a stationary recoil platen extending parallel to and substantially coextensive with said movable recoil platen and spaced a relatively slight distance therefrom, and a film of shock absorbing fluid of suitable viscosity intermediate of said movable and stationary recoil platens, said recoil stud passing freely through said stationary platen, and said movable platen being positioned below the latter, said stud having a splash cover secured thereto.

4. In a recoil apparatus for testing machines, an oil retainer, an upper recoil platen fixed therein and provided with ports, a lower recoil platen movable in said oil retainer below said upper platen, a pendant peripheral flange on said lower platen having ports therein, a recoil stud passing freely through said upper platen and having its lower end secured to said movable platen, and an oil splash cover fast on said recoil stud and overhanging but out of contact with said oil retainer.

5. In a recoil apparatus for testing machines, a fixed oil retainer, an upper recoil platen secured therein and provided with ports, a lower recoil platen movable in said oil retainer below said upper platen, a pendant peripheral flange on said lower platen having ports therein, said flange fitting loosely in said oil retainer, a recoil stud passing freely through said upper platen, and having its lower end fixedly secured to said movable platen, and an oil splash cover fast on said recoil stud and movable therewith, and having an outer peripheral lateral flange overhanging said oil retainer, and a pendant annular flange positioned within but out of contact with a recess at the top of said oil retainer.

6. In a recoil apparatus for testing machines, a stationary oil retainer, a stationary upper recoil platen in threaded engagement with said oil retainer and fixed therein and provided with ports, a lower recoil platen movable in the lower portion of said oil retainer below said upper fixed platen, a pendant peripheral flange on said lower platen having ports therein, said flange fitting loosely in said oil retainer, a recoil stud passing freely through said upper platen, and having its lower end in threaded engagement with said movable platen and fixedly secured thereto, an oil splash cover fast on said recoil stud and movable therewith and having an outer peripheral lateral flange overhanging said oil retainer, and a pendant annular flange positioned at all times within but out of contact with an annular seat at the top of said oil retainer, there being an oil chamber formed in the lower portion of said oil retainer and above said upper fixed recoil platen, said chambers being in communication through said ports.

7. In a recoil apparatus for testing machines, a fixed oil retainer, an upper recoil platen secured therein and provided with a hub, radial ribs and ports in said hub intermediate said ribs, a lower recoil platen movable in said oil retainer below said upper platen, a pendant peripheral flange on said lower platen having ports therein, said flange fitting loosely in said oil retainer, a recoil stud passing freely through said upper platen, and having its lower end fixedly secured to said movable platen, an oil splash cover fast on said recoil stud and movable therewith and having an outer peripheral lateral flange overhanging said oil retainer, and a pendant annular flange positioned within but out of contact with an annular recess at the top of said oil retainer.

8. The combination of a movable element of a testing machine, a recoil stud fixedly secured at its upper end thereto, a fixed oil retainer, an upper recoil platen fixedly secured in the latter and provided with ports, a lower recoil platen movable in said oil retainer below said upper platen, a pendant peripheral flange on said lower platen fitting loosely in said oil retainer and having ports therein, said recoil stud passing freely through said upper platen and having its lower end fixedly secured to said movable platen, and an oil splash cover fast on said recoil stud and overhanging but out of contact with said oil retainer.

WILLIAM C. MORAN.